United States Patent
Carter

(10) Patent No.: US 6,986,642 B2
(45) Date of Patent: Jan. 17, 2006

(54) EXTREME MU ROTOR

(75) Inventor: Jay W. Carter, Burkburnett, TX (US)

(73) Assignee: Cartercopters, L.L.C., Wichita Falls, TX (US)

( * ) Notice: Subject to any disclaimer, the term of this patent is extended or adjusted under 35 U.S.C. 154(b) by 127 days.

(21) Appl. No.: 10/652,970

(22) Filed: Aug. 29, 2003

(65) Prior Publication Data

US 2004/0042901 A1    Mar. 4, 2004

Related U.S. Application Data

(60) Provisional application No. 60/407,761, filed on Aug. 30, 2002.

(51) Int. Cl.
*B64C 27/467* (2006.01)

(52) U.S. Cl. .................. 416/139; 416/141; 416/226; 416/228; 416/230; 416/238

(58) Field of Classification Search ............... 416/144, 416/145, 134 A, 139, 141, 226, 228, 230, 416/235, 237, 238, 241 A
See application file for complete search history.

(56) References Cited

U.S. PATENT DOCUMENTS

| | | | | |
|---|---|---|---|---|
| 3,467,197 | A | * | 9/1969 | Spivey et al. ............... 416/228 |
| 3,822,105 | A | * | 7/1974 | Jepson ....................... 416/228 |
| 4,077,741 | A | * | 3/1978 | Lowson et al. ............. 416/228 |
| 4,281,966 | A | * | 8/1981 | Duret et al. ............ 416/134 A |
| 5,246,344 | A | | 9/1993 | Perry |
| 5,727,754 | A | | 3/1998 | Carter, Jr. |
| 6,024,325 | A | | 2/2000 | Carter, Jr. |
| 6,155,784 | A | * | 12/2000 | Carter, Jr. ............... 416/134 A |
| 6,168,383 | B1 | * | 1/2001 | Shimizu ..................... 416/228 |
| 6,231,308 | B1 | * | 5/2001 | Kondo et al. ............... 416/228 |
| 6,527,515 | B2 | | 3/2003 | Carter, Jr. |

* cited by examiner

*Primary Examiner*—Christopher Verdier
(74) *Attorney, Agent, or Firm*—Bracewell & Giuliani LLP

(57) ABSTRACT

A rotor for a rotary wing aircraft includes a blade having a leading edge, and a trailing edge. The rotor has a leading edge tip extension at a tip of the blade and a weight within the leading edge tip extension. The rotor also includes a trailing edge tip extension extending from a selected point at an outboard portion of the blade to the tip of the blade, a leading edge of the extension extending rearward from the trailing edge of the blade.

24 Claims, 3 Drawing Sheets

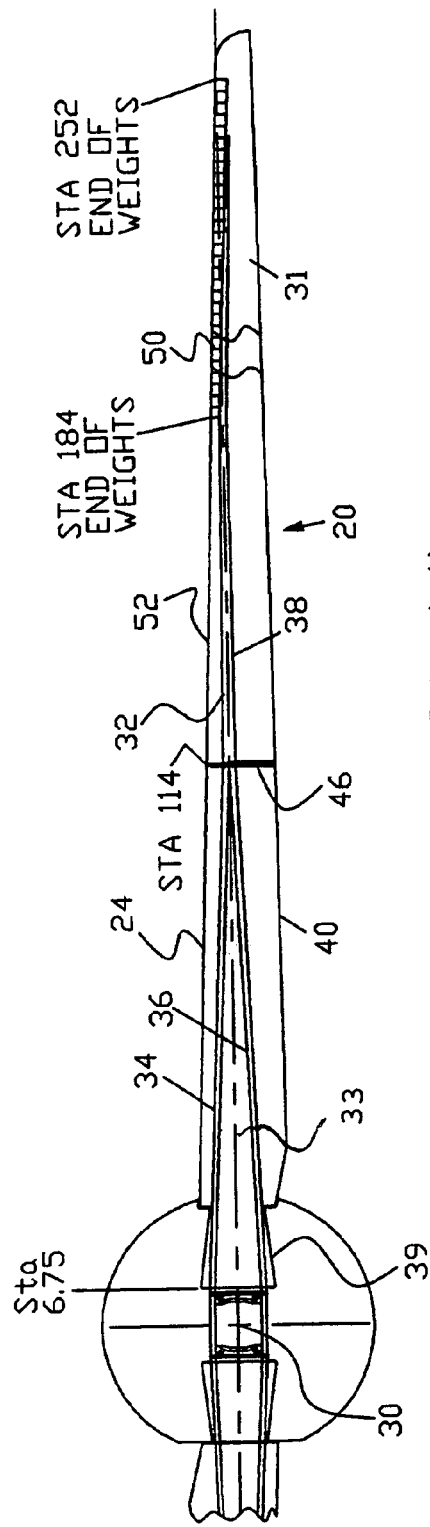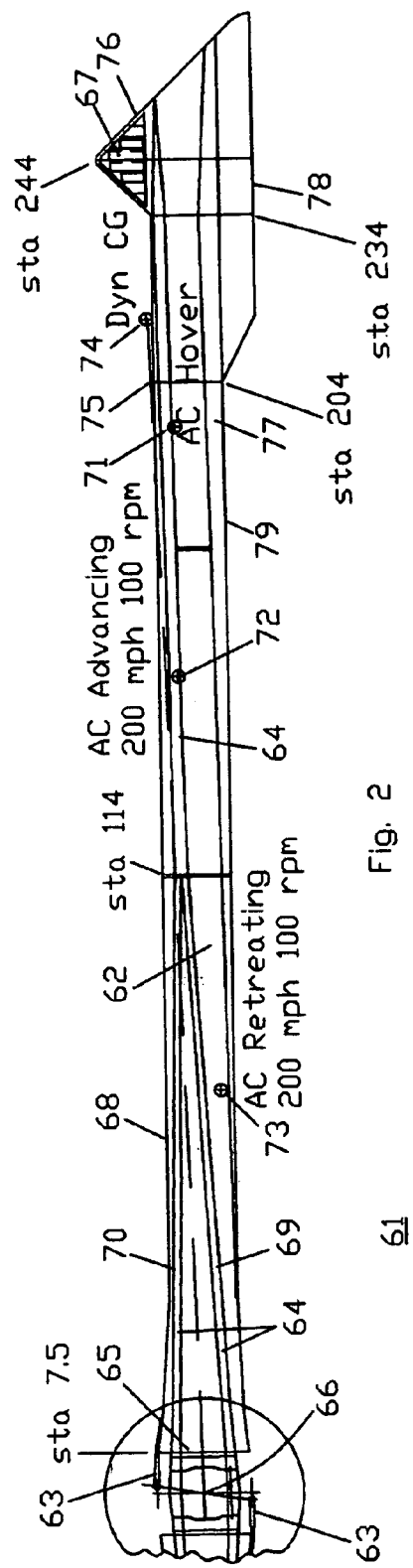
Fig. 1 (Prior Art)
Fig. 2

EXTREME MU ROTOR

CROSS-REFERENCE TO RELATED APPLICATIONS

This application claims the priority to and the benfit of U.S. Provisional Application No. 60/407,761 filed Aug. 30, 2002, titled EXTREME MU ROTOR.

BACKGROUND OF THE INVENTION

1. Field of the Invention

This invention relates generally to rotary wing aircraft, and particularly to rotor blades used on rotary wing aircraft.

2. Brief Description of the Related Art

Recent improvements in rotary wing aircraft rotors have been developed primarily for helicopter applications in which the rotor is powered full time, as opposed to gyrocopters or gyroplanes in which the rotor is not powered or is powered only prior to takeoff. While the leading edge and trailing edge extensions of the present invention are advantageous for both helicopters and gyroplanes, some of the requirements of the two applications are different. For example, it is desirable for gyroplanes to have jump takeoff capability, in which the rotor is spun up on the ground to a high rotational speed (much higher than is used for takeoff in helicopters) with zero blade angle of attack, then vertical takeoff is performed by increasing the blade angle of attack. The high rotational rate required for jump takeoff requires a rotor with higher in-plane stiffness than is required for helicopters, since the stiffness required to maintain a natural frequency higher than the maximum rotation rate (required in two-bladed rotors) increases with the square of the rotation rate.

At high aircraft forward speed, inboard portions of the retreating blade are stalled and provide little lift, so only the tip of the retreating blade will be providing lift. Since the advancing and retreating blades must provide equal lift moments around the rotor head, the advancing blade can only provide as much lift moment as the retreating blade. Rotor RPM of the helicopter is typically selected as a compromise between desiring a slow RPM to prevent entering compressibility in the advancing blade while desiring an increased RPM to prevent or minimize retreating blade stall.

Gyroplanes or other rotary wing aircraft designs having an alternative lift producing mechanism utilized during cruise flight, thus are not as concerned with retreating blade stall. Instead, the gyroplane type aircraft are concerned with reducing drag caused by the rotating rotor. For example, if the pilot wishes to accelerate rather than climb, as the aircraft speed increases, the pilot can level the rotor tip path plane. This reduces the rotor plane of rotation relative to the airstream, reduces the rotor disk angle of attack, and slows the rotor down. Once the rotor has been sufficiently unloaded by providing lift with the alternate source, such as fixed wings, and providing thrust with an alternate source, such as a propeller or jet engine, the rotor blades can maintain lift moment equilibrium about the hub with only the rotor flapping.

Rotor flapping is the mechanism by which the advancing blade and retreating blades can produce the same lift moments. In order to work, the blades must be free to move up and down. This free flapping allows the advancing blade, which has more lift due to a higher velocity across it than the retreating blade, to rise or flap up. As the advancing blade rises, the resultant (vector sum of horizontal and vertical air velocities) flow angle across the blade (angle of attack) drops and reduces its lift. The faster the advancing blade rises, the more the resultant angle of attack is reduced and the more its lift drops. The opposite occurs on the retreating blade. As the advancing blade goes up, the retreating blade drops since the blades are tied together and because the retreating blade is not producing as much lift as the advancing blade. As the retreating blade drops (flaps), the resulting angle of airflow across the blade goes up and increases its lift. The faster the retreating blade drops, the more its angle of attack is increased and the more its lift increases. This characteristic whereby the lift on the retreating blade increases as the blade drops works whether the air flows from leading edge to trailing edge or from the trailing edge to the leading edge. The flapping automatically increases until the vertical velocity component changes the angle of attack on both the advancing and retreating blades until they both have the same lift.

As the rotor RPM slows down, the centrifugal force decreases until at some point there would not be enough centrifugal force to keep relatively soft and flexible rotor blades stable. To allow the rotor to be slowed down as much as practical, weight is added to the blade tips.

Rotor blade tip weights have been used in gyroplane type aircraft in order to increase rotor inertia to minimize the required rotor RPM during pre-takeoff. However, increasing the weight placed in the rotor blade in order to additionally reduce the rotor RPM requires an increase in the in-plane stiffness necessary to maintain a natural frequency higher than the maximum rotation rate. The horsepower requirement necessary to spin a rotor of a gyroplane type aircraft is typically a function of the cube of the rotor RPM ratio. That is, the applicant has recognized that a three-fold reduction in rotor RPM from 300 RPM to 100 RPM will reduce the horsepower required to spin the rotor at 100 RPM to that of $\frac{1}{27}$ that required at 300 RPM. This reduction in the RPM results in higher mu values, mu being the ratio of forward speed of aircraft to tip speed of rotor relative to the speed of an aircraft. The prior art, however, has not shown a method or device to provide a rotor with sufficient structural integrity and stability to reduce the rotor RPM sufficiently to obtain a mu value greater than 0.87. Thus, the applicant has recognized the need for a rotor blade design that can maximize stability in the overall rotor as a whole, while providing sufficient structural support to support blade tip weights to achieve a mu value of at least 1.0.

SUMMARY OF THE INVENTION

In view of the foregoing, an embodiment of the present invention advantageously provides a rotor for rotary wing aircraft including a blade having a leading edge, a trailing edge, a root, a spar, a dynamic center of gravity, a dynamic center of gravity twist axis extending from the root to the dynamic center of gravity, and an aerodynamic center.

Specifically, the rotor further has a leading edge tip extension at a tip of the blade and a weight within the leading edge tip extension. The rotor also includes a trailing edge tip extension extending from a selected point at an outboard portion of the blade to the tip of the blade. The outboard most portion of the trailing edge tip extension extends beyond the main part of the rotor, with the leading edge of that portion being behind the trailing edge of the main part of the rotor. The leading edge tip extension includes a weight within the leading edge tip extension. The weight is advantageously positioned forward of the leading edge of the blade. This position shifts the dynamic center of gravity forward of a position of the same blade without a leading edge tip extension. The trailing edge tip extension functions to shift the aerodynamic center of pressure of the blade toward the trailing edge of the blade in order to increase a moment between the dynamic center of gravity twist axis and the aerodynamic center of the blade when the blade is advancing into an airstream of the rotary wing aircraft in forward flight.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and are therefore not to be considered limiting of its scope as the invention may admit to other equally effective embodiments.

FIG. 1 is a plan view of a prior art rotor.

FIG. 2 is a plan view of a rotor constructed according to an embodiment of the present invention.

DETAILED DESCRIPTION OF THE PREFERRED EMBODIMENT

Figure 3:
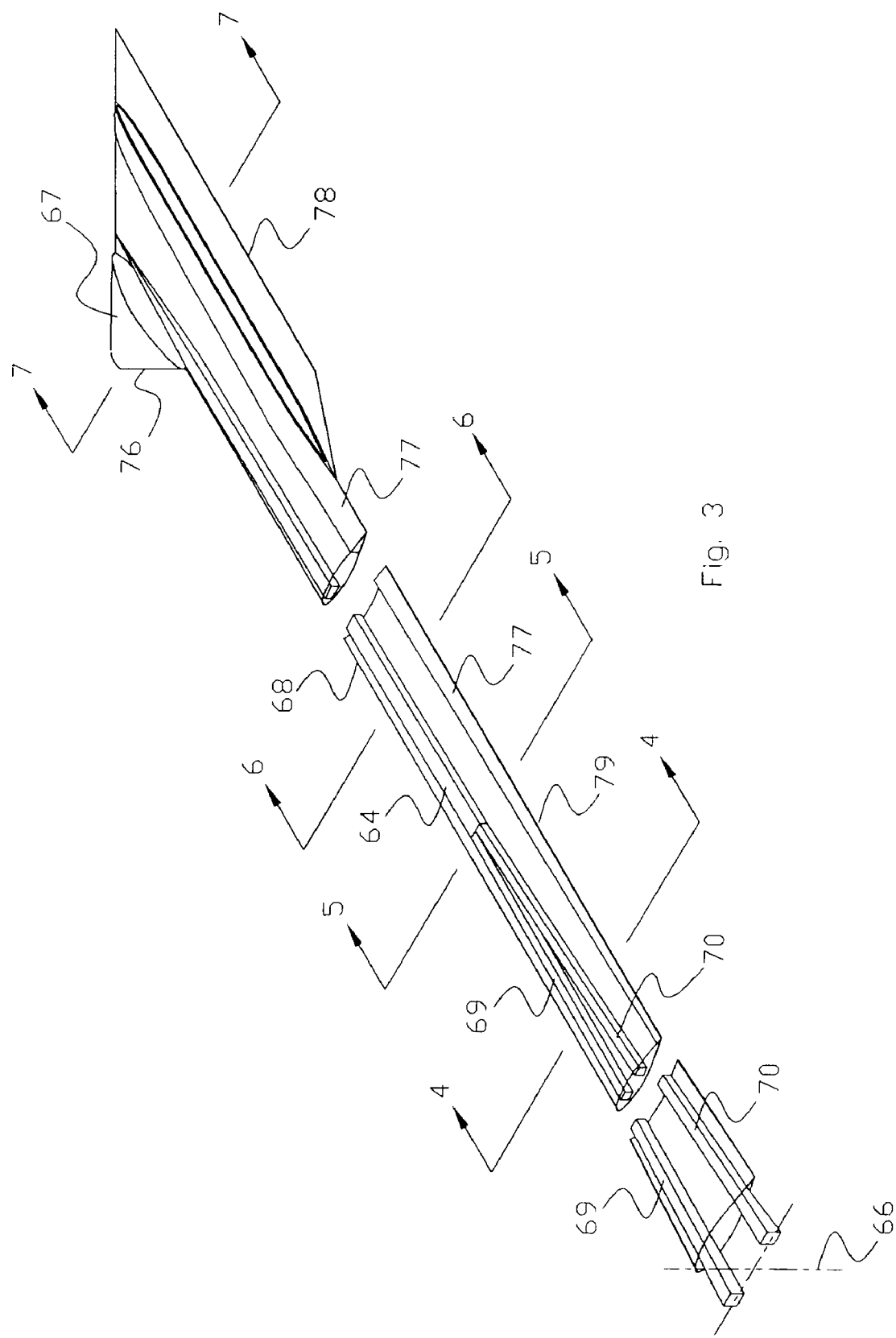
FIG. 3 is a partial cutaway elevational view of the rotor shown in FIG. 2.
Figure 4:
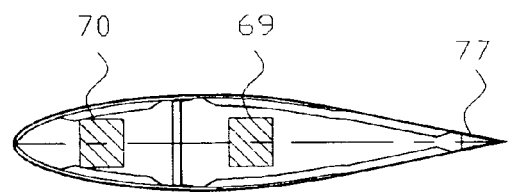
FIG. 4 is a cross-sectional view taken along the 4—4 line of FIG. 3.

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Referring to FIG. 1, a complete half of a prior art rotor is shown of the type described in U.S. Pat. No. 6,527,515, by Carter, Jr., titled "Rotor for Rotary Wing Aircraft." The rotor 20 has an outer blade assembly 24 including a spar 32 separated along the central section into two spar caps 34, 36. The spar caps 34, 36 merge with one another to form a single outboard spar portion 38. A blade cuff 39 is used to transfer pitch control forces to the blade assembly 24 to twist the spar caps 34, 36. The blade assembly 24 has an outer blade housing 40 that is made up of an upper skin and a lower skin. The blade housing 40 is not swept back, but the very outboard section is swept back like a shark fin to reduce noise. The separation of the spar caps 34, 36 from one another is gradually reduced from the root, or axis of rotation 30 toward the station 114 of the rotor blade assembly 24. The spar caps 34, 36, become joined to one another at approximately station 114. A reinforcing rib 46 is located at that station as well. Inboard of the rib 46, the spar caps 34, 36 are not bonded to the blade housing 40, so that they may be moved upwardly and downwardly within the housing 40. Outboard of the rib 46, the spar portion 38 is bonded to the blade housing 40 using bonding material.

Tip weights 50 are disposed along the leading edge 52 of the blade assembly 24. The tip weights 50 extend from station 184 outwardly to station 252. The location of the tip weights 50 approximates the pitch change axis 33. The weights 50 are positioned to minimize the average distance between the weights 50 and the pitch change axis 33. The rearward sweep (dogleg) of the spar portion 38 near the tip 31 allows for this placement. The tip weights 50 are positioned near the leading edge 52 to keep the dynamic center of mass ahead of the blade aerodynamic center. The tip weights 50 are distributed evenly in front of and behind the structural centerline of the inboard section of the spar 32.

Referring to FIGS. 2–7, shown is a rotor 61 according to an embodiment of the present invention. Generally, rotor 61 comprises blade 62, spar 64, tip weights 67, a leading edge tip extension 76, and a trailing edge tip extension 78.

More specifically, rotor 61 includes an outer blade 62 with a spar 64 disposed therein. The blade 62 forms the aerodynamic housing of the rotor 61. The rotor 61 preferably has two blades 62 that extend outwardly from a rotor pitch control unit 63. The construction of the two blades are substantially identical therefore, only one blade 62 is shown, in its entirety in FIG. 2, and described in detail. Stations along the blade 62 are indicated by numerals. As discussed herein, stations refer to a position measured in inches from the axis of rotation of the rotor 61. Dimensions given are for illustrative purposes only. As stated, the blade 62 of rotor 61 includes a spar 64 disposed therein. Spar 64 can be of either unitary construction or fixedly attached at or near the root or axis of rotation in order to form a unitary spar, or equivalent thereof, that extends nearly blade end-to-blade end.

In the preferred configuration, rotor 61 utilizes an I-beam type spar 64 similar to the type described in U.S. Pat. No. 6,527,515, incorporated by reference. In the embodiment shown in FIGS. 2–7, spar 64 preferably comprises spar caps 69, 70 that are separated from one another proximate the root 65 or rotational axis 66 of the blade 62 and merge with one another at approximately station 114 to form a single outboard spar portion. The root 65 and rotational axis 66 may or may not be the same location, depending upon the configuration of the spar 64. The separation of the spar caps 69, 70, from one another is gradually reduced from the root or axis of rotation of rotor toward station 114. In the preferred configuration, the spar caps 69, 70 join at or near the same station where bonding begins between blade 62 and spar 64, station 114. Although other types of spars 64 that are either unitary or can be made functionally unitary through use of a connecting attachment or assembly (not shown) are within the scope of the present invention, the preferred configuration utilizes a unitary spar 64 using spar caps 69, 70, described above.

Functionally, a spar such as spar 64 formed of spar caps 69, 70, sufficiently spaced apart can provide extremely efficient structural edgewise stiffness. When formed of a material, such as a unidirectional carbon in a unitary structure, the spar 64 and spar caps 69, 70, though torsionally very soft, can carry centrifugal loads at a much higher level than other materials that are both commercially currently available and economically feasible to use. The selected height of the spar caps 69, 70, is, to some extent, dictated by the beamwise or flatwise stiffness needed to prevent the blade 62 from drooping excessively when not at an operational RPM. The selected width or thickness of the spar caps

69, 70, is, to some extent, dictated by the centrifugal loads on blade 62. The spar 64 outboard of station 114 is bonded to the blade 62 at a forward section adjacent the leading edge 68 of blade 62 to provide edgewise stiffness necessary to compensate for an edgewise moment created by centrifugal loads applied to weights 67 in the leading edge tip extension 76 across the differential distance between the center of mass of the weights and the center line of the blade 62 (described later).

Figure 5:
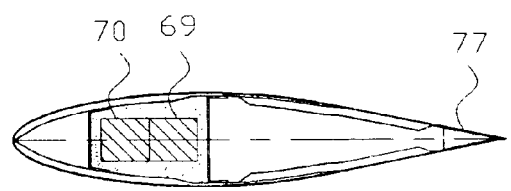
FIG. 5 is a cross-sectional view taken along the 5—5 line of FIG. 3.
Figure 6:
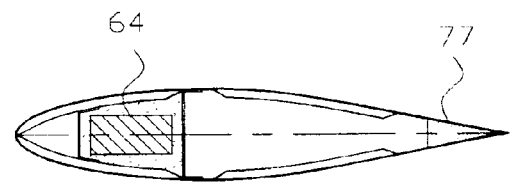
FIG. 6 is a cross-sectional view taken along the 6—6 line of FIG. 3.

As stated above, the spar 64 is preferably configured so that spar caps 69, 70, are spaced apart near the center of rotation, and eventually join at station 114 (FIG. 5). Centrifugal force acting on the spar caps 69, 70, tends to keep the spar caps in the plane of rotation of rotor 61. If not joined, additional force may be required to maintain a positive pitch setting in blade 62. Joining the spar caps 69, 70, at or near where the spar 64 is fixedly attached or bonded to blade 62 tends to reduce the force required to twist spar 64. Blade 62 rotates around axis 75 for pitch change (collective control), twisting spar 64 between station 7.5, where pitch change forces are applied, and station 114.

In the preferred configuration, the rotor 61 utilizes a tilting spindle for control, as opposed to a swash plate as is common in some other rotorcraft. The tilting spindle serves the same purpose as cyclic pitch control in a swash plate type system. Collective pitch control is accomplished separately using a collective pitch control mechanism 63. Because of the relative simplicity of this mechanism (small number of parts and joints), it can be made to be very rigid.

Figure 7:
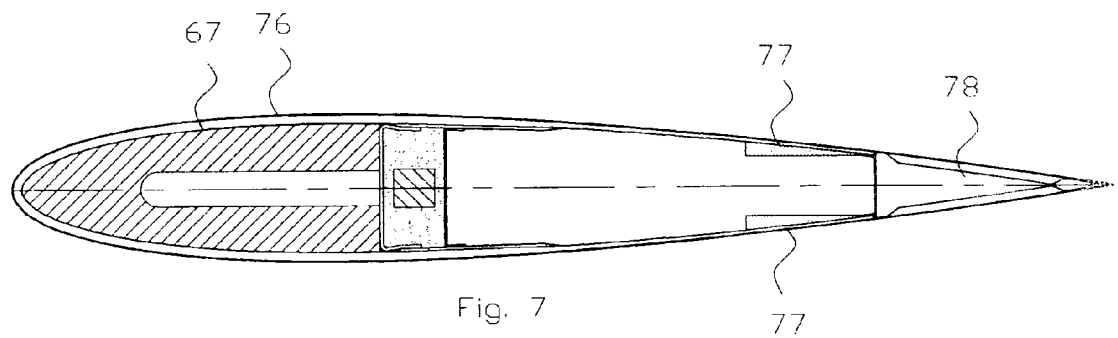
FIG. 7 is a cross-sectional view taken along the 7—7 line of FIG. 3.

Referring also to FIG. 7, the rotor 61 features a leading edge tip extension 76 at the tip of the rotor blade 62 that extends forward of the leading edge of the rotor blade 62. In the preferred configuration of a blade the size shown in FIG. 2, the leading edge tip extension 76 begins at station 234 and reaches a maximum chord at station 244. The shape and/or position of the leading edge tip extension 76 allows weights 67 to be added further forward of the rotor quarter-chord location (the location ¼ the distance of the blade chord measured from the advancing edge of the airfoil) such that the entire weight can be position substantially forward of the leading edge 68 of the blade 62, than in a rotor blade without the extension 76, increasing the overall stability of the rotor 61 (stability described in more detail later).

The leading edge tip extension 76 has a swept geometry. The inboard leading edge of extension 76 is swept between its point of maximum chord station 244 and the leading edge 68 of blade 62 at station 234, an approximate forty-five degree angle. The outboard leading edge of extension 76 is also swept preferably at approximately a forty-five degree angle. The inboard and outboard edges define a triangular configuration for tip extension 76 with the apex at station 244 forward of leading edge 68. The critical Mach number of an airfoil is a function of apparent velocity over an airfoil as well as the thickness of the airfoil. Sweeping the leading edges of the leading edge extension 76 reduces the apparent velocity at the tip. This allows for a thicker airfoil and higher velocity before reaching the critical Mach number than would be possible with a straight leading edge. The thicker airfoil increases the torsional rigidity of the rotor 61 so the weights 67 can be placed further forward. The thicker airfoil also allows for increased volume in the leading edge so that there is sufficient space for positioning of weights 67. For example, in the CarterCopter prototype with a 44 ft. diameter rotor, over 65 pounds of lead can be added to each leading edge tip extension 76. The weights 67 can be any high-density material but is preferably either lead or depleted uranium (which has a density 1.7 times that of lead). In the preferred embodiment, weights 67 are also triangular in configuration and co-extensive with leading edge extension 76. The base of the triangular defined by weights 67 is on a straight line located slightly leading and parallel to the leading edge 68 of blade 62.

Correspondingly, a trailing edge tip extension 78 can be located at or near the outer edge of the rotor blade 62 and extends aft of the rotor trailing edge 79. The trailing edge tip extension 78 for the size rotor blade 62 shown in FIG. 2 preferably begins at station 204 and maintains essentially a constant width until the blade tip. This extension 78 moves the center of pressure of the rotor 61 further towards the trailing edge of blade 62, further increasing stability (the significance described in detail later). Trailing edge tip extension 78 is generally rectangular, having a trailing edge that is parallel to the trailing edge 79 of blade 62. The trailing edge of the extension 78 preferably is swept from station 204 at approximately a forty-five degree angle until the extension maintains a constant width. The leading edge of the outermost tip of the trailing edge tip extension 78 is preferably swept at approximately a forty-five degree angle from the forward edge of the tip extension to a station approximately 1.4" inboard of the tip, where the sweep begins increasing such that it reaches 90 degrees at the tip.

While in rotation, the rotor is preferably configured to twist about a line connecting between the rotational axis 66 and the dynamic center of gravity (CG) 74 of each rotor blade 62, called the dynamic CG twist axis 75, rather than about the true CG. This is due to the fact that the rotor 61 is being supported by a pivot near the midpoint, which in this configuration, restrains the rotor 61. For a given deflection, such as that resulting from blade flapping, outboard portions of the rotor blade 62 will move more than inboard portions, so the outboard portion will have a bigger effect on rotor dynamics. In the most preferred configuration, spar caps 69, 70, join at a point along the dynamic CG twist axis 75. The location of the dynamic CG 74 can be determined by first dividing the rotor 61 into sections, then finding the effect of each section. The spanwise location of the dynamic CG 74, the location along the radial length of the rotor blade, can be determined using the formula:

$$DynMass_{span} = \frac{\sum wt \times R^2}{\sum wt \times R}$$

The chordwise location of the dynamic CG 74, the location along the chord of the rotor blade, can be determined using the formula:

$$DynMass_{chord} = \frac{\sum wt \times d \times R}{\sum wt \times R}$$

where:
wt equals the weights of the section,
R equals the radius of the center of mass of the section from the rotor hub center, and
d equals the distance of the section static center of gravity CG from the trailing edge or any straight reference line.

The aerodynamic center (AC) of the rotor blade 62, the location where all aerodynamic forces acting on the rotor blade are considered to be located, is velocity dependent and changes for a given rotor blade section and position according to the combined velocity experienced by the rotor blade as a result of the aircraft velocity and the rotor rotation. The aerodynamic center can also be determined in a similar manner to the dynamic CG 74. The blade 62 is first divided into sections, and then the aerodynamic center can be found by finding the aerodynamic effect on each section. The spanwise location of the aerodynamic center can be determined using the formula:

$$AC_{span} = \frac{\sum A \times R \times V^2}{\sum A \times V^2}$$

The chordwise location of the aerodynamic center can be determined using the formula:

$$AC_{chord} = \frac{\sum A \times y \times V^2}{\sum A \times V^2}$$

where
A equals the area of the section,
R equals the radius of the center of mass of the section from the hub center,
V equals the velocity of the rotational relative wind (approximately the aircraft velocity plus rotor blade section velocity), and
y equals the distance of the section AC (quarter-cord position from leading edge of the section) from the trailing edge or any straight reference line.

Placing the weights 67 forward of the quarter-chord position of the rotor blade 62 increases the overall stability of the rotor 61. For a near constant chord rotor at zero forward airspeed (hover or flat pitch, zero wind), the AC 71 of the rotating rotor blade is located approximately at the quarter-chord of the blade, and in the configuration shown in FIG. 2, at approximately the ¾ radius. This AC 71 is behind the dynamic CG twist axis 75 of the blade, making it stable.

For a rotor 61 to be stable, there must be a restoring force when the angle of attack of the blade 62 is changed. Since the aerodynamic force acting on the rotor 61 can be considered as acting on blade 62 through the aerodynamic center, the aerodynamic center must be behind the dynamic CG twist axis 75 for the blade 62 of the rotor 61 to be stable. The distance differential between the dynamic CG twist axis 75 and the aerodynamic center generates a moment which tends to twist the rotor blade 62 back towards zero pitch. Control linkages of the rotary wing aircraft (not shown) correspondingly create a moment equal and opposite to that moment. The equilibrium between the two forces holds the blade 62 at a desired pitch. In the preferred embodiment of the present invention, at the fore and aft locations of the rotor disc where the blades of an aircraft rotor are moving perpendicularly to the aircraft direction (12:00 and 6:00 position), the airspeed has basically little effect on the rotor stability, and the aerodynamic center of each blade can be considered as basically the same as that for zero airspeed, AC 71. At the lateral positions where the blades of the aircraft rotor are moving parallel to the aircraft direction (9:00 and 3:00 positions), the airspeed has a maximum effect on the aerodynamic center of each blade. A rotor blade rotating about a hub on an aircraft (not shown) that is moving with the aircraft (from 6:00 through 3:00 to 12:00 on a counter-clockwise rotating rotor) is called the advancing blade, while the blade that is moving in a direction opposite that of the aircraft (from 12:00 through 9:00 to 6:00 on a counter-clockwise rotating rotor) is called the retreating blade. The advancing blade aerodynamic center is shown at AC 72 for the example configuration shown in FIG. 2 and the retreating blade aerodynamic center is correspondingly shown at AC 73.

As aircraft forward airspeed increases (forward flight), the advancing blade AC 72 shifts inboard toward the hub. This phenomenon is because the airflow increase over the inboard sections of the rotor blade 62 is proportionally greater than that over the outboard sections. On an advancing blade that is properly configured, the advancing blade AC 72 remains behind the dynamic CG twist axis 75, and thus, the advancing blade remains stable. On the retreating blade of the rotor in forward flight, the retreating blade AC 73 also shifts inward toward the hub or center of rotation 66. This phenomenon is due to a combination of increased reverse airflow over the inboard sections, and reduced airflow over the outboard sections. The retreating blade AC 73 also shifts toward the ¾ chord position measured relative to the leading edge 68 of the advancing blade (the quarter-chord position measured from the trailing edge of the retreating blade) as the airflow over the inboard regions of the retreating blade becomes reversed. That is, at a sufficient airspeed, the trailing edge 79 of the inboard sections of the retreating blade advances into the relative wind. The combination of this increased reverse air-flow and the shift in AC 73 toward the ¾ chord causes the retreating rotor blade to become unstable, i.e., the retreating blade aerodynamic center is now forward of the dynamic CG 74 relative to the airflow.

Note, the retreating blade will produce lift even if the air is flowing in the opposite direction, trailing edge to leading edge. The airfoil, however, is an inefficient airfoil because it has a sharp trailing edge and therefore cannot operate at very high angles of attack without stalling. However, when the rotor 61 is unloaded, such as during cruise flight of an autogyro-type aircraft, the rotor 61 faces a very shallow angle of attack across the retreating blade so it typically does not stall, or even if it does, the stall is not extremely pronounced.

For example, when the pitch (angle of attack) of a properly configured rotor blade 62 is a positive value, the blade 62 should generate positive lift, which in turn generates a moment (lift across the distance differential between the dynamic CG twist axis 75 and the aerodynamic center AC 71) which tends to try to return the rotor blade 62 to zero pitch. As stated, this moment is balanced by control input. If a disturbance causes the rotor blade 62 to deviate to a higher pitch, the lift force generated is greater, the moment is greater than the counterforce of the control input, and the rotor blade 62 tends to return to its original pitch. If the disturbance causes the rotor blade 62 to go to a slightly lower pitch, the lift force generated is reduced, the moment is less than the counterforce of the control input, and the rotor blade 62 tends to return to its original pitch. In contrast, an unstable rotor blade 62 which has the aerodynamic center AC 73 in front of the dynamic CG twist axis 75 does not have such a dampening effect. In this aerodynamic situation, the moment created by the increased lift acting at a distance from the dynamic CG 75 twist axis tends to cause the rotor blade to increase pitch away from zero pitch—either a higher angle of attack for positive pitch, or a more negative angle of attack for negative pitch. In an aerodynamic situation where the rotor blade 62 is already at positive pitch, if a disturbance causes the rotor blade 62 to deviate to a slightly higher pitch, the lift force generated will be higher, which will create a stronger moment trying to drive the rotor blade 62 away from zero pitch, and away from the original pitch. The unstable rotor blade 62 can be kept from diverging, but it requires another force—generally either an increase from the controls or a restoring force such as from another rotor blade 62.

To obtain an ever increasing forward airspeed, in particular, that exceeding a mu ratio of 0.5, a positive stability on the rotor 61, as a whole, should be maintained. To maintain such positive stability on a rotor 61, the sum of the stabilities of the rotor 61 taken throughout a 360 degree plane of rotation must remain positive. To maintain stability in this manner, the collective pitch control mechanism 63 must be very rigid, so that the stability moments of the blades will be transferred cyclically, and not collectively. As an example, if the collective pitch control mechanism is not rigid, if the retreating blade is unstable, and there is a moment driving the trailing edge up, forces transferred through the collective pitch mechanism would drive the advancing blade trailing edge up. This would decrease the pitch, reducing the lift and the corresponding stability moment, allowing the retreating blade to move even more. With a rigid collective pitch control mechanism, the moment driving the retreating blade trailing edge up will be transferred to the other blade through either the tilting hub in the preferred embodiment, or the cyclic control mechanism in a swash plate type system. The resulting force on the advancing blade will increase the pitch, increasing the lift and the corresponding stability moment, driving the retreating blade back to the original position. Stability can be increased by adding a leading edge tip extension 76 forward of the leading edge 68 of blade 62 and by adding the trailing edge tip extension 78 aft of the trailing edge 79 of blade 62.

The leading edge tip extension 76 allows for weights 67 to be positioned forward of the leading edge of blade 62, shifting the dynamic CG twist axis 75 of the blade 62 further forward. The weights 67 are preferably positioned as far forward of the leading edge 68 of the blade as to still be within the structural limitations of the materials used in the rotor manufacture and dependent upon the centrifugal and RPM expected to be acting upon the rotor.

The trailing edge tip extension 78 correspondingly shifts the aerodynamic center AC 71 further toward the trailing edge 79 of the blade 62. This configuration can greatly increase the stability of the advancing blade by providing an increased moment arm between the dynamic CG twist axis 75 and the advancing blade aerodynamic center AC 71. It also decreases the stability of the retreating blade by increasing the moment arm between the dynamic CG twist axis 75 and in the retreating blade aerodynamic center AC 73. However, because the airflow over the advancing blade is greater than that over the retreating blade, the increase in stability on the advancing blade is greater than the decrease on the retreating blade, resulting in a net stability increase. Note that a decrease in stability is the same as an increase in instability, and that above a certain mu ratio, the retreating blade will always be unstable. Note also, that because an inherently stable rotor system will not try to diverge, advantageously it does not need nearly as stiff of a control system as an inherently unstable rotor system.

In the preferred configuration, the trailing edge tip extension 78 is positioned adjacent the outer section of the blade 62. The reason for positioning the trailing edge tip extension 78 adjacent the outer section, and not simply increasing the chord of the entire blade, is to take advantage of the velocity distribution over the rotor blade when the aircraft has a positive forward airspeed. For example, when the mu is greater than 1, the entire retreating blade will be in reverse airflow, whereby the reverse velocity will be highest near the blade root, and lowest near the blade outboard tip. That is, at mu=1, the velocity at the tip of the retreating blade is zero. The velocity distribution of the retreating blade is the opposite that of the advancing blade; the velocity of the advancing blade being highest at the tip, and lowest at the blade root. By placing the trailing edge tip extension 78 adjacent the outermost tip, the trailing edge tip extension 78 has the least amount of influence on the aerodynamic center of the retreating blade, while having a large influence on that of the advancing blade. Correspondingly, the trailing edge tip extension 78, with its large chord, will increase the stability of the advancing blade more than it decreases the stability of the retreating blade. This, of course, improves the overall stability of the rotor system. Note, if the rotor is not inherently stable, only the stiffness in the aircraft control system and stiffness in the rotor are available to control the instability. Note, although the prototype does not require a boosted system because the rotor is inherently stable, at a mu of greater than 1.5, a boosted flight control system should be utilized.

As stated above, large torsional loads created on the rotor 61, tend to twist the blade 62 either towards or away from a zero pitch angle, particularly depending on whether or not the rotor is stable. In the preferred configuration, the largest contributor to this load is the moment created by the lift acting at a distance from the dynamic CG twist axis 75. The effect is greatest when the rotor is producing the most lift, which occurs during takeoff (discussed in more detail below). A smaller contributor to the torsional loading is caused by centrifugal forces. Centrifugal forces tend to move all rotating masses toward the plane of rotation because the plane of rotation is always the maximum distance that mass can attain from the axis of rotation. For example, when a symmetrical rotor blade is at zero pitch relative to the plane of rotation, the mass above the plane of rotation is matched by an equal mass below the plane of rotation, so no pitch moments are created. However, when the rotor blade is pitched up, such as when the rotary wing aircraft pilot pulls collective, masses near the leading edge are above the plane of rotation, and masses near the trailing edge are below the plane of rotation. Centrifugal force tries to move both masses toward the plane of rotation, creating a moment driving the blade toward zero pitch. This effect is greatest during takeoff, when the rotor is at high RPM and high pitch angles. Note, the stress at any station in the blade 62 is the sum of stresses caused by the centrifugal force and bending moments of all masses from the station to the blade tip where moments are measured around the blade neutral axis at the radius of the station.

To carry the torsional loads, it is desirable for the airfoil to have as great a cross sectional area as possible which can be accomplished by using a thicker airfoil. By sweeping the leading edges of the leading edge extension 76 of the rotor 61, it is possible to use a thicker airfoil as well as spin the rotor at higher RPM's before reaching the critical Mach number. Critical Mach is, in part, a function of the thickness of the airfoil because thickness affects how far the air passing over the blade has to flow in order to get around the airfoil. Thus, a thicker airfoil results in earlier entry of critical Mach. Sweep lowers the effective airspeed seen by the airfoil by a factor of the cosine of the angle of the sweep, allowing the airspeed seen by the advancing blade to reach a much higher value prior to the aerodynamic structure entering critical Mach, i.e., one can then operate with a lot higher tip speed, a lot thicker air foil, and a higher angle of attack without getting into critical Mach, by having the leading edge swept. The structural integrity of blade 62 is the function of the square of the area of the skin that surrounds the airfoil. For example, for a constant thickness airfoil skin, if one were to double the thickness of the airfoil, the area would double but the torsional stiffness would increase as a function of its area squared. This results in an airfoil that is four times stiffer for the same thickness skin and weight.

In an embodiment of the present invention, as stated, placing weights 67 so far forward in the rotor 61 puts the weights 67 far away from the structural axis of the rotor 61. In this configuration, the centrifugal force on the weights 67 creates high edgewise moments, resulting in high tension forces in the leading edge 68, and corresponding high compressive forces in the trailing edge 79. This effect is most pronounced in the outboard sections of the rotor 61, adjacent where the weight 67 is concentrated. To carry the high edgewise moments, a strip of structural material such as unidirectional fiber or carbon can be positioned along the leading edge or in the extension 76. The unitary portion of spar 64 combined with the airfoil skin can function for this purpose. At a sufficiently high rotor RPM, however, there is also a structural limit as to how far in front of the leading edge of rotor the weights 67 can be placed.

To carry the compressive forces in the trailing edge 79 of rotor 61, the preferred configuration includes an additional trailing edge spar 77, separate and spaced apart from spar 64, composed of a structural member such as unidirectional fiber added to the trailing edge 79 of the rotor 61 inside the skin of blade 62. In the preferred configuration, spar 77 begins at an inboard portion of blade 62 and extends to the outboard tip of the blade 62. The spar 77 is tapered toward the inner surfaces of the trailing edge 79 of the blade 62 at its beginning and increases in width progressively until reaching station 234. At station 234 the spar 77 again tapers till reaching the tip of the blade 62, the width of spar 77 at the blade tip being larger than the width of the spar at its beginning. In the section of the spar 77 extending from station 204 to the tip of the blade, the spar 77 divides into two members, one bonded adjacent to the upper skin, and the other bonded adjacent to the lower skin, with the rearward edge of the trailing edge spar 77 being adjacent the trailing edge 79 of the blade 62. The size of the spar 77 necessary to help compensate for the compressive forces places a practical limit on the maximum rotor RPM. As design maximum RPM is increased or as weight 67 is positioned farther forward, the edgewise moments of the leading edge 68 and compressive loads of the trailing edge 79 can be so high that the volume of blade 62 is insufficient to house a spar of sufficient size or strength necessary to carry the required loads. This limit however, applies mainly to autogyros with a jump takeoff capability, since the rotor will have to be spun to a higher RPM for take off than what is needed for normal flight in order to store the energy needed for the takeoff. For an aircraft such as a helicopter, with the rotor powered for takeoff, the rotor will not have to spin as fast, since energy will be continuously available from the engine. Correspondingly, as spar manufacturing technology improves, the amount and forward position of the weights 67 can be increased along with the take off jump rotor speed needed where the rotor is utilized with an autogyro.

In an embodiment of the present invention utilizing the spar methodology described above, the rotor 61 is manufactured as a unitary piece starting at the hub of the blade 62. In this embodiment, the blade 62 is positioned in a mold from the root of the blade 62 to the farthest tip. The leading edge 68 of the blade, the wedge shaped leading edge tip extension 76, and the trailing edge tip extension 78 are preferably also formed at the same time. Blade skins are first laid up and cured. The shear webs (not shown) and the spar 64 are then bonded within the blade 62 along with the weight 67.

In operation, the exemplary rotor 61, can be used on a rotary wing aircraft such as an autogyro. In this configuration, the rotor 61 is accelerated to a speed (RPM) necessary to takeoff. The spar 64, trailing edge spar 77, and thickness of the airfoil provide sufficient structural integrity to maintain the required takeoff RPM. In flight, a propeller or other thrust producing device begins to accelerate the aircraft to achieve increasing horizontal velocity to maintain altitude, first with the rotor 61 providing most of the lift, then with the wing providing most of the lift. To maximize forward velocity, drag must be minimized. The pilot reduces the rotor RPM from, for example, 300 RPM to 100 RPM, a reduction in RPM to one-third of that utilized in slow flight, where the rotor is providing most of the lift. The reduction in the rotor RPM results in a reduction in horsepower required to maintain the rotor at 100 RPM to that of $\frac{1}{27}$th of the horsepower required in slow flight, 300 RPM. The combination of the leading edge tip extension 76 and trailing edge tip extension 78 results in an advancing rotor blade providing more stability at the higher forward airspeeds and lower rotor RPMs than the reduced stability in the retreating blade, which provides an overall inherent stability to the entire rotor system, taken as a whole. The spar 64, trailing edge spar 77, and thickness of the airfoil provide sufficient structural integrity to withstand the aerodynamic forces inherent with the design forward airspeed and rotor RPM combination resulting in a mu ratio exceeding 0.5.

The invention has several advantages. The rotor system advantageously includes a rotor that can maintain rotor stability at higher mu ratios in order to reduce the stiffness required in the rotor blade pitch controls and lessen the control forces. The higher mu ratios can be as high as 1.3 without the necessity for a boost system in the flight controls. Advantageously, an embodiment of the present invention provides an improved rotor having very high in-plane stiffness, which can carry dense weights forward of the leading edge, and which will remain inherently stable at low rotation rates due to an advanced dynamic CG, high rotational inertia, and large differential between the location of an advanced dynamic CG twist axis and aerodynamic center of pressure for an advancing blade. Advantageously an embodiment of the present invention also provides for the reduction in the rotor RPM and thus the rotor rotational drag component, which is a cubic function of rotor speed. Relatively small reductions in rotor speed will dramatically reduce drag, which in turn dramatically increases performance, especially when most lift to the rotary wing aircraft is being provided by a source other than the rotor, such as fixed wings. In a gyroplane type aircraft, the fixed wings may be designed for optimum lift required for cruise airspeed rather than designed to provide lift necessary for landing the aircraft. This design modification allows for a reduction in the fixed wing wing area by a factor of as high as 4 or 5, a reduction to $\frac{1}{4}$th or $\frac{1}{5}$th, and a corresponding reduction in drag as a result of the smaller fixed wings.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, optionally, the rotor blade need not be molded into a single unitary rotor but could be two separate rotor blades fixedly attached at some midpoint. Still further, the rotor may be used on a helicopter-type rotary wing aircraft that provides powered flight directly to the rotor system rather than an autogyro which features a rotor that is driven by the forward speed of the aircraft.

What is claimed:

1. A rotor for rotary wing aircraft including a blade having a leading edge and a trailing edge and a dynamic center of gravity twist axis, the rotor comprising:
   a leading edge tip extension at a tip of the blade; and
   a weight within the leading edge tip extension, at least part of the weight positioned forward of the leading edge of the blade and having a preselected mass so that the dynamic center of gravity twist axis of the blade extends forward of the leading edge.

2. The rotor of claim 1, further comprising a trailing edge tip extension extending from a selected point at an outboard portion of the blade to the tip of the blade, a leading edge of the trailing edge tip extension extending rearward from the trailing edge of the blade, and wherein the leading edge tip extension and the trailing edge tip extension are configured in combination so that when in stable cruise flight and the blade is advancing the combination provides more resultant stability than resultant loss of stability due to the configuration when in stable cruise flight and the blade is retreating.

3. The rotor of claim 1, wherein the leading edge of the leading edge tip extension is swept, wherein the weght comprises high-density material, and wherein the weight has a weight exceeding approximately 65 pounds.

4. The rotor of claim 1, wherein the leading edge extension is triangular in configuration, having inboard and outboard edges that converge to an apex, and wherein the rotor futher comprises a trailing edge tip extension extending from a selected point at an outboard portion of the blade to the tip of the blade, a trailing edge of the trailing edge tip extension extending parallel to the trailing edge of the blade.

5. The rotor of claim 1, futher comprises a longitudinal spar extending from a rotor axis of rotation, the spar including a pair of seperate spar caps in an inboard portion and a single spar portion in an outboard portion formed by merged spar caps, wherein the seperate spar caps are not bonded to the blade along substantially their entire lengths, and wherein the single spar portion of the longitudinal spar is entirely bonded in a forward section of the blade adjacent the leading edge of the blade and position to support high edhewise moments resulting from the weight.

6. The rotor of claim 1, further comprising a trailing edge spar extending from the trailing edge of the blade at an inboard portion of the blade to the tip of the blade, a rearward edge of the trailing edge spar adjacent the trailing edge of the blade, the trailing edge spar having a tapered proximal end portion and a tapered distal end portion.

7. The rotor of claim 1, further comprising a trailing edge tip extension extending from a selected point at an outboard portion of the blade to the tip of the blade, a leading edge of the trailing edge tip extension extending rearward from the trailing edge of the blade, and wherein a chord extending through the leading edge tip extension and the trailing edge tip extension is greater than a chord at any other portion of the blade, to thereby increase stability of the blade when advancing to a greater degree than a decreased stability of the blade formed when retreating.

8. The rotor of claim 1, further comprising:
   a trailing edge tip extension extending from a selected point at an outboard portion of the blade to the tip of the blade, a leading edge of the trailing edge tip extension extending rearward from the trailing edge of the blade; and
   a trailing edge spar exteding from the trailing edge of the blade at an inboard portion of the blade to the tip of the blade, a rearward edge of the trailing edge spar adjacent the trailing edge of the blade.

9. The rotor of claim 8, wherein a width of the trailing edge spar is tapered from the inboard portion of the blade to an outer portion of the blade.

10. The rotor of claim 1, further comprising a trailing edge tip extension extending from a selected point at an outboard portion of the blade to the tip of the blade, a leading edge of the trailing edge tip extension extending rearward from the trailing edge of the blade, and wherein an aerodynamic center of pressure for the blade is positioned further toward the trailing edge of the blade and further from the dynamic center of gravity twist axis than the blade without the trailing edge tip extension, and wherein the aerodynamic center of pressure pf the retreating blade in normal cruise flight is aft of a mid point of a chord due to the high reverse airflow of high-mu flight.

11. A rotor for rotary wing aircraft including a blade having a leading edge and a trailing edge, the rotor comprising:
   a leading edge tip extension at a tip of the blade; and
   a weight within the leading edge tip extension, the entire weight substantially positioned forward of the leading edge of the blade.

12. A rotor for rotary wing aircraft including a blade having a leading edge and a trailing edge, the rotor comprising:
   a leading edge tip extension at a tip of the blade;
   a weight within the leading edge tip extension, at least part of the weight positioned forward of the leading edge of the blade; and
   a longitudinal spar extending from a rotor axis of rotation, the spar including a pair of separate spar caps in an inboard portion and a single spar portion in an outboard portion formed by merged spar caps, wherein the separate spar caps are not bonded to the blade along substantially their entire lengths, wherein the single spar portion of the longitudinal spar is entirely bonded in a forward section of the blade, and wherein the spar caps merge with one another to form the single portion of the spar at a position approximately coinciding with a point along a line extending from the blade dynamic center of gravity to the axis of rotation.

13. A rotor for rotary wing aircraft including a blade having a leading edge and a trailing edge, the rotor comprising:
   a leading edge tip extension at a tip of the blade;
   a weight within the leading edge tip extension, at least part of the weight positioned forward of the leading edge of the blade;
   a trailing edge tip extension extending from a selected point at an outboard portion of the blade to the tip of the blade, a leading edge of the trailing edge tip extension extending rearward from the trailing edge of the blade; and
   a trailing edge spar extending from the trailing edge of the blade at an inboard portion of the blade to the tip of the blade, a rearward edge of the trailing edge spar adjacent the trailing edge of the blade, and wherein the trailing edge spar separates into a pair of spar members at an outboard portion of the blade adjacent the trailing edge tip extension, one of the spar members extending to the tip of the blade adjacent an upper surface of the blade and another of the spar members extending to the tip of the blade adjacent a lower surface of the blade.

14. A rotor for rotary wing aircraft including a blade having a leading edge and a trailing edge, the rotor comprising:
an outboard portion having a leading edge tip extension positioned forward of the leading edge of the blade having an apex that is forward of a leading edge of an inboard portion of the blade;
a weight in the leading edge tip extension, substantially all of the weight being located on a line forward of the leading edge of the inboard portion;
a trailing edge tip extension opposite the leading edge extension in the outboard portion extending rearward from a trailing edge of the inboard portion of the blade; and
wherein a chord passing thru the apex and the trailing edge extension is greater in length than any other chords of the rotor.

15. The rotor of claim 14, wherein the leading edge extension is triangular in configuration, having inboard and outboard edges that converge to the apex.

16. The rotor of claim 14, wherein lengthwise spans of the leading edge extension and the trailing edge extension are substantially less than a span of the rotor for an axis of rotation.

17. The rotor of claim 14, wherein lengthwise span of the leading edge extension is less than that of the trailing edge extension.

18. The rotor of claim 14, wherein the trailing edge tip extension has a rearward edge that is aft of the trailing edge of the blade.

19. The rotor of claim 14, further comprising a longitudinal spar extending from a rotor axis of rotation, the spar including a pair of separate spar caps in an inboard portion and a single spar portion in an outboard portion formed by merged spar caps, wherein the separate spar caps are not bonded to the blade along substantially their entire lengths, and wherein the single spar portion of the longitudinal spar is entirely bonded in a forward section of the blade.

20. The rotor of claim 14, wherein an aerodynamic center of pressure for the blade is positioned further toward the trailing edge of the blade and further from the dynamic center of gravity twist axis than the blade without the trailing edge tip extension, and wherein the aerodynamic center of pressure of a retreating blade in normal cruise flight is aft of a midpoint of a chord due to the high reverse airflow of high-mu flight.

21. The rotor of claim 14, further comprising a trailing edge spar extending from the trailing edge of the blade at an inboard portion of the blade to the tip of the blade, a rearward edge of the trailing edge spar adjacent the trailing edge of the blade.

22. The rotor of claim 21, wherein a width of the trailing edge spar is tapered from the inboard portion of the blade to an outer portion of the blade.

23. The rotor of claim 21, wherein the trailing edge spar separates into a pair of spar members at an outboard portion of the blade adjacent the trailing edge tip extension, one of the spar members extending to the tip of the blade adjacent an upper surface of the blade and another of the spar members extending to the tip of the blade adjacent a lower surface of the blade.

24. A rotor for rotary wing aircraft including a blade having a leading edge, a trailing edge, and an axis of rotation, the rotor comprising:
an outboard portion having a leading edge tip extension positioned forward of the leading edge of the blade having an apex that is forward of a leading edge of an inboard portion of the blade;
a weight in the leading edge tip extension, substantially all of the weight being located on a line forward of the leading edge of the inboard portion;
a trailing edge tip extension opposite the leading edge extension in the outboard portion extending rearward from a trailing edge of the inboard portion of the blade;
a longitudinal spar extending from the rotor axis of rotation, the spar including a pair of separate spar caps in an inboard portion and a single spar portion in an outboard portion formed by merged spar caps, wherein the separate spar caps are not bonded to the blade along substantially their entire lengths, and wherein the single spar portion of the longitudinal spar is entirely bonded in a forward section of the blade;
wherein a chord passing thru the apex and the trailing edge extension is greater in length than any other chords of the rotor;
wherein lengthwise spans of the leading edge extension and the trailing edge extension are substantially less than a span of the rotor for the axis of rotation;
wherein an aerodynamic center of pressure for the blade is positioned further toward the trailing edge of the blade and further from the dynamic center of gravity twist axis than the blade without the trailing edge tip extension; and
wherein the aerodynamic center of pressure of a retreating blade in normal cruise flight is aft of a midpoint of a chord due to the high reverse airflow of high-mu flight.

* * * * *